Figure 1:
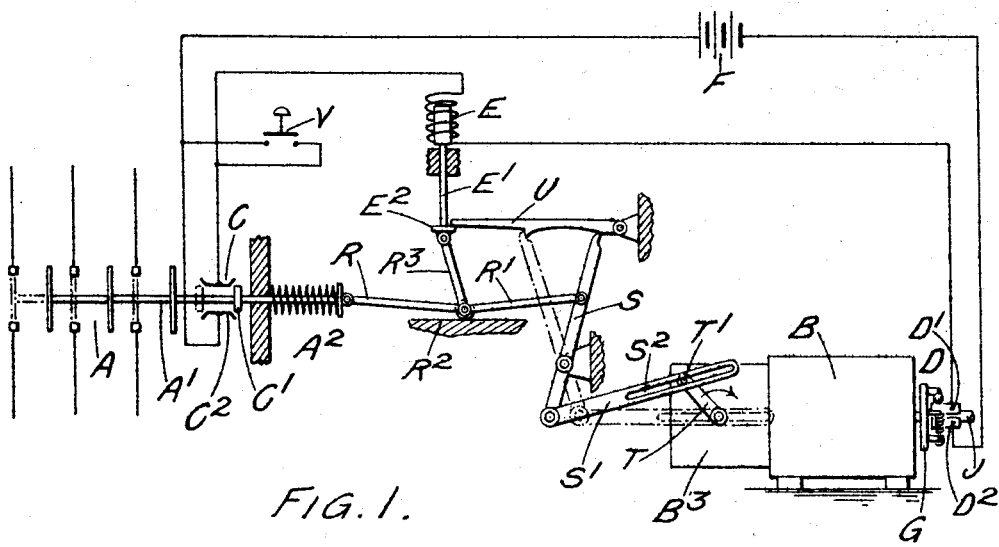

Dec. 29, 1931.  F. COATES ET AL  1,838,528
CONTROLLING APPARATUS FOR ELECTRIC CIRCUIT BREAKERS
Filed Sept. 26, 1929   2 Sheets-Sheet 1

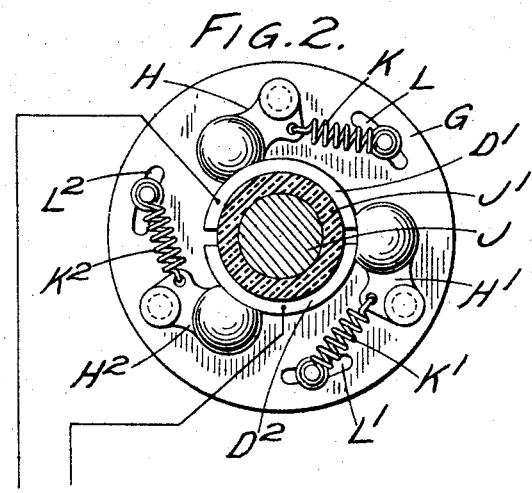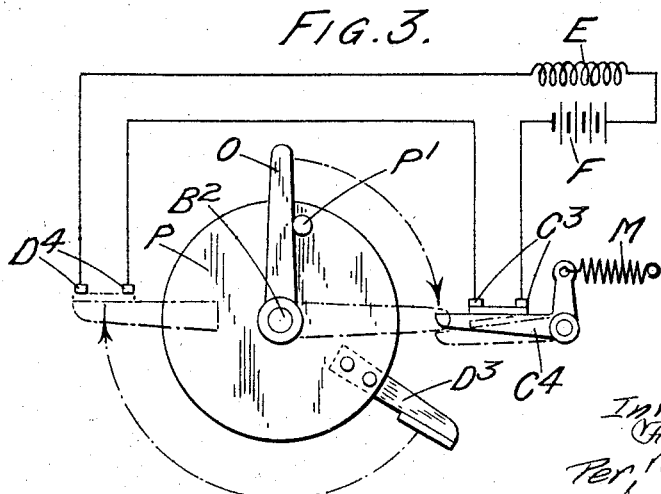

Patented Dec. 29, 1931

1,838,528

UNITED STATES PATENT OFFICE

FRANK COATES, OF CLEADON, AND ROBERT ANDERSON, OF HEBBURN-ON-TYNE, ENGLAND, ASSIGNORS TO A. REYROLLE & COMPANY LIMITED, OF HEBBURN-ON-TYNE, ENGLAND, A COMPANY OF GREAT BRITAIN

CONTROLLING APPARATUS FOR ELECTRIC CIRCUIT BREAKERS

Application filed September 26, 1929, Serial No. 395,409, and in Great Britain November 3, 1928.

This invention relates to controlling apparatus for electric circuit-breakers more particularly of the kind in which the closing mechanism is motor operated, and has for its object to effect the immediate operation of tripping mechanism for the circuit-breaker should the motor for any reason fail during a closing operation.

In a motor operated circuit-breaker, if the motor stops during a closing operation, which in the case of an electric motor may be due, for example, to a failure in the source of supply or a mechanical or electrical defect in the motor itself, the circuit-breaker may be in a position such that the sparking contacts thereof will be burnt out, or, in the case of circuit-breakers having charging resistances across such sparking contacts, these resistances, which are usually designed to deal with the current only for the short period necessary for the circuit-breaker to close or open, will become hot and will be burnt out unless provision is made for causing the tripping mechanism immediately to operate.

According to the present invention a device directly operated by the motor is arranged to cause the tripping mechanism for the circuit-breaker to operate if the motor fails during a closing operation, means being provided for rendering said device inoperative or ineffective when the circuit-breaker is fully closed.

In one arrangement such device may be adapted to operate when the speed of the motor is less than a predetermined value and preferably consists of a centrifugally controlled or operated switch having its contacts in a tripping circuit for the circuit-breaker so as to complete such circuit when the speed of the motor falls below the predetermined value. A second switch controlled by the circuit-breaker is arranged in the tripping circuit so that said circuit is opened independently when the circuit-breaker is fully closed or fully open.

In another arrangement an inertia device may be arranged so that when the motor starts to close the circuit-breaker the inertia device is caused to move and after a predetermined movement closes contacts in a trip circuit for the circuit-breaker, said circuit being in the meantime opened at other contacts if the motor operates normally to close the circuit-breaker fully.

The following is a description by way of example of a preferred arrangement of motor operated circuit-breaker and trip circuit and of two forms of switching device adapted to be operated by the motor, with reference to the accompanying drawings in which Figure 1 shows diagrammatically a motor operated circuit-breaker with a trip circuit controlled according to this invention, Figure 2 is an elevation drawn to a larger scale showing details of a centrifugal switch forming part of Figure 1, Figure 3 is an elevation of an inertia switching device shown in association with the trip circuit.

Referring to Figure 1 a three-phase circuit-breaker A is arranged to be operated by an electric motor B through actuating mechanism comprising an operating rod $A^1$, toggle links R $R^1$, a pivoted lever S and a link $S^1$ having a slot $S^2$ in which the pin $T^1$ of a crank T engages, the crank T being driven through gearing, indicated by the box $B^3$, by the motor B.

The circuit-breaker A is normally retained in the open position, in which it is shown in the figure, by a sprng $A^2$ and is moved into the closed position, which is indicated by the dotted lines in the figure, by energizing the motor so that the crank T is rotated in the direction of the arrow. Rotation of the crank T causes the pin $T^1$ to slide along the slot $S^2$ until it engages the end of the slot and moves the link $S^1$ which in turn rotates the lever S in a counter-clockwise direction. Rotation of the lever S moves, through the toggle links R $R^1$, which are retained in the offset position shown by the stop $R^2$, the circuit-breaker operating rod $A^1$ against the action of the spring $A^2$ until, when the crank is in the dead center position, the contacts of the circuit-breaker A are closed. When the circuit-breaker is closed the upper end of the lever S is engaged by a gravity or spring-controlled catch U so that further rotation of the crank T does not open the circuit-breaker, the pin $T^1$ of the crank merely moving along the slot $S^2$. The lost motion coupling obtained by means of the slot $S^2$ in the link $S^1$ permits the motor B to attain its normal speed before it starts to move the closing mechanism and to maintain this speed until the circuit-breaker has actually closed, after which the motor can be switched off and allowed to come to rest without affecting the circuit-breaker.

A switch C comprising elongated contacts $C^2$ and a bridging member $C^1$ mounted on the circuit-breaker operating rod $A^1$ is arranged so that the switch is closed except when the circuit-breaker is in the fully open or fully closed position. A second switch D, which is of the centrifugal type, an example of which is more fully described hereinafter, is arranged to be operated by the motor shaft $B^1$ in such a way that its contacts $D^1$ and $D^2$ are closed when the motor B is stationary, or its speed is below a predetermined value, while these contacts are maintained open when the motor operates at its normal speed.

The independent trip coil E of the circuit-breaker A is connected to a battery E, or other suitable source of power, in series with the contacts of the two switches C and D so that the circuit is only completed and the trip coil energized if the switches are closed simultaneously.

The trip coil E, when energized, moves through its tripping rod $E^1$ a link $R^3$ connected to the common pivotal point of the links R and $R^1$ so that when the coil is energized this pivotal point is moved across the dead center position and the toggle collapses to allow the circuit-breaker to be opened by the spring $A^2$. The rod $E^1$ is also provided with a projection $E^2$ which engages the catch U and releases the lever S to permit this lever to return to the normal open position when the trip coil E is operated to open the circuit-breaker from the fully closed position. In order to trip the circuit-breaker when it is fully closed a push button V is provided which, when actuated, short-circuits the switch C. Actuation of the push button V therefore completes the circuit of the trip coil E since the switch D is closed when the circuit-breaker is fully closed and the motor stationary.

Normally when the motor is energized to close the circuit-breaker it rotates at a speed such that the switch D is open and therefore the trip coil remains deenergized although as soon as the circuit-breaker starts to operate member $C^1$ moves on to contacts $C^2$ to close switch C. When the circuit-breaker reaches the closed position switch C opens just before the speed of the motor drops to a value such that switch D closes; thus the trip coil remains inoperative. It is to be noted that there is sufficient lost motion between the motor B and the actuating mechanism of the circuit-breaker, during the initial starting movement, for the motor to reach a speed at which switch D opens before movement of the circuit-breaker mechanism causes switch C to close.

If during a closing operation the motor stops or its speed drops below the predetermined value, either by reason of a failure in the power supply thereto or a mechanical defect in the motor, the switch D closes its contacts thus, as switch C is closed, completing the trip circuit. The circuit-breaker thereupon moves to its fully open position.

A suitable form of centrifugal switch is shown in Figure 2 and comprises a conducting disc G mounted on the end of the motor shaft $B^1$ (Figure 1) so as to rotate therewith and carrying three symmetrically disposed weighted arms H, $H^1$ and $H^2$ pivoted thereto. A stationary shaft J, carrying an insulating bushing $J^1$ on which are mounted two conducting segments $D^1$ and $D^2$ forming the two contacts of the switch D, shown in Figure 1, is mounted adjacent the disc G so that the inner surfaces of the arms H, $H^1$ and $H^2$ bear thereon. Springs K, $K^1$ and $K^2$ are connected respectively to the arms H, $H^1$ and $H^2$ so as to press the arms against the segments $D^1$ and $D^2$, the other ends of the springs being fixed to pins mounted in slots L, $L^1$ and $L^2$ in the disc G so that the tension of the springs and consequently the pressure of the arms on the segments can be adjusted.

When the motor is at rest or is rotating at a speed less than the predetermined value the arms rest on the segments $D^1$ and $D^2$ and connect electrically the two segments either directly, as is done by the weight $H^1$ in the position shown in the drawings, or through the disc G, the switch thus being closed. The mass of the arms and the tension of the springs is so adjusted that when the speed of the motor is greater than the predetermined value the arms, rotating with the disc, move outward owing to centrifugal force, and the segments $D^1$ and $D^2$ no longer being connected, the switch is opened.

In the alternative arrangement shown in Figure 3 contacts $C^3$ in the trip circuit are normally closed by a pivoted arm $C^4$ biased by a spring M. A shaft $B^2$ carrying a crank O is geared or connected to the actuating mechanism of the circuit-breaker so that if the motor operates normally the crank O will move through about 90° into the dotted position in Figure 3 and will move the arm $C^4$ and open the trip circuit at $C^3$ just before the circuit-breaker is closed. Adjacent to the crank O is a flywheel P freely mounted and carrying a pin $P^1$ which is driven by the crank. The flywheel P carries an arm $D^3$ and, when the flywheel has been set in motion by the crank, its momentum is sufficient to carry the arm D³ round into the position in which it bridges the contacts D⁴ thus closing a gap in the trip circuit.

Normaly, i. e. supposing the motor to have closed the circuit-breaker, the other gap at C³ will have been opened by the movement of the arm C⁴ before the gap at D⁴ is closed and therefore the trip circuit is not energized but in the event of the motor stopping before the circuit-breaker has been fully closed the gap at C³ will remain closed and the closing of the gap at D⁴ will complete the trip circuit.

The operation of this alternative arrangement is therefore similar to that described with reference to Figures 1 and 2, the flywheel P constituting an inertia switching device which fulfills the same purpose as the centrifugal switch of the earlier figures.

The specific arrangements above described are by way of example only and it will be appreciated that equivalent devices or modified forms of the above described devices may be used within the scope of the invention.

What we claim as our invention and desire to secure by Letters Patent is:—

1. In a controlling system for an electric circuit-breaker, the combination of closing mechanism for the circuit-breaker, a motor for operating the closing mechanism, a tripping circuit for the circuit-breaker, a switching device directly operated by the motor and so associated with the tripping circuit that the circuit is completed to trip the circuit-breaker if the motor fails during a closing operation and means for rendering the switching device inoperative or ineffective when the circuit-breaker is fully closed.

2. In a controlling system for an electric circuit-breaker, the combination of closing mechanism for the circuit-breaker, a motor for operating the closing mechanism, a tripping circuit for the circuit-breaker, a switching device directly operated by the motor and arranged to operate to complete the tripping circuit when the speed of the motor is less than a predetermined value, and means for rendering the switching device inoperative or ineffective when the circuit-breaker is fully open or fully closed.

3. In a controlling system for an electric circuit-breaker the combination of closing mechanism for the circuit-breaker, a motor for operating the closing mechanism, a tripping circuit for the circuit-breaker, a first switching device directly operated by the motor and so associated with the tripping circuit that the circuit is completed to trip the circuit breaker if the motor fails during a closing operation and a second device controlled by the circuit-breaker for rendering the first device inoperative or ineffective when the circuit-breaker is fully open or fully closed 4. In a controlling system for an electric circuit-breaker the combination of closing mechanism for the circuit-breaker, a motor for operating the closing mechanism, a tripping circuit for the circuit-breaker, a centrifugally controlled switch actuated by the motor and arranged to complete the tripping circuit if the speed of the motor is less than a predetermined value and means for rendering the switch ineffective to complete the tripping circuit when the circuit-breaker is fully open or fully closed.

5. In a controlling system for an electric circuit-breaker the combination of closing mechanism for the circuit-breaker, a motor for operating the closing mechanism, a tripping circuit for the circuit-breaker, a centrifugally controlled switch actuated by the motor and arranged to complete the tripping circuit if the speed of the motor is less than a predetermined value and a switch controlled by the circuit-breaker and arranged to open the tripping circuit when the circuit-breaker is fully open or fully closed.

6. The combination of a circuit-breaker, closing mechanism therefor, a motor for operating the closing mechanism, a tripping circuit for the circuit-breaker, a centrifugally controlled switch arranged in the tripping circuit and so actuated by the motor that it is closed when the speed of the motor is less than a predetermined value, and a switch arranged in the tripping circuit and so controlled by the circuit-breaker that it is closed when the circuit-breaker is between the fully opened and fully closed positions.

7. In a control system for an electrical circuit-breaker the combination of closing mechanism for the circuit-breaker, a motor for operating the closing mechanism, a tripping circuit for the circuit-breaker, an inertia-controlled switching device, means for setting the said device in motion operated by the motor when it starts to close the circuit-breaker, contacts carried by said device and adapted after a predetermined movement of the device to complete the tripping circuit to trip out the circuit-breaker, and means operative in the meantime for opening the tripping circuit independently of said switching device if the motor operates normally to close the circuit-breaker.

In testimony whereof we have signed our names to this specification.

FRANK COATES.
ROBERT ANDERSON.